(12) United States Patent
Platt et al.

(10) Patent No.: US 9,163,847 B2
(45) Date of Patent: Oct. 20, 2015

(54) METHODS FOR THE CONVERSION OF STORAGE CONTAINERS FOR THE REMEDIATION OF ENVIRONMENTALLY DAMAGED ARTICLES

(71) Applicant: PACK-RAT MINI-MOVER, LLC, Bethesda, MD (US)

(72) Inventors: Donald Platt, Estero, FL (US); James Barbour, Wendell, NC (US); Shawn Potwin, Wake Forest, NC (US)

(73) Assignee: PACK-RAT MINI-MOVER, LLC, Bethesda, MD (US)

( * ) Notice: Subject to any disclaimer, the term of this patent is extended or adjusted under 35 U.S.C. 154(b) by 0 days.

(21) Appl. No.: 14/218,377

(22) Filed: Mar. 18, 2014

(65) Prior Publication Data

US 2014/0196268 A1   Jul. 17, 2014

Related U.S. Application Data

(62) Division of application No. 13/447,782, filed on Apr. 16, 2012, now Pat. No. 9,004,306.

(60) Provisional application No. 61/482,505, filed on May 4, 2011.

(51) Int. Cl.
| | |
|---|---|
| *F24F 7/04* | (2006.01) |
| *B09B 3/00* | (2006.01) |
| *E04H 1/12* | (2006.01) |

(52) U.S. Cl.
CPC .................. *F24F 7/04* (2013.01); *B09B 3/0016* (2013.01); *B65D 2588/746* (2013.01); *E04H 2001/1283* (2013.01); *Y10T 29/49716* (2015.01)

(58) Field of Classification Search
CPC ..................... E04H 2001/1283; E04H 1/1277; Y10T 29/49716
See application file for complete search history.

(56) References Cited

U.S. PATENT DOCUMENTS

| | | | | |
|---|---|---|---|---|
| 2,752,864 | A | * | 7/1956 | McDougal, Sr. et al. ...... 410/130 |
| 2,853,161 | A | * | 9/1958 | Mascari ........................... 52/212 |
| 4,848,617 | A | * | 7/1989 | Zygaj .............................. 220/1.5 |
| 5,038,494 | A | | 8/1991 | Lundquist et al. |
| 5,365,013 | A | * | 11/1994 | Aulson ........................ 588/249 |
| 5,507,122 | A | | 4/1996 | Aulson |
| 5,511,908 | A | | 4/1996 | Van Valkenburgh et al. |
| 5,546,678 | A | | 8/1996 | Dhaemers |
| 5,785,591 | A | * | 7/1998 | Payne ........................... 454/118 |
| 6,155,747 | A | * | 12/2000 | Payne et al. .............. 405/129.55 |
| 7,591,107 | B2 | | 9/2009 | Labuschagne |
| 2002/0157318 | A1 | * | 10/2002 | Teubert et al. .................. 49/360 |
| 2008/0060790 | A1 | * | 3/2008 | Yates et al. ................... 165/80.3 |
| 2008/0106137 | A1 | * | 5/2008 | Paton-Ash et al. ............. 299/12 |
| 2009/0115164 | A1 | | 5/2009 | Coy et al. |

(Continued)

*Primary Examiner* — Christopher M Koehler
(74) *Attorney, Agent, or Firm* — Nixon & Vanderhye P.C.

(57) ABSTRACT

Methods for the remediation of environmentally damaged articles includes removably positioning a conversion door having a height-adjustable header assembly and a plurality of access ports with respect to an access opening of a storage container so as to close the access opening with the container door in an opened condition, and connecting at least one of the access ports with remediation equipment to permit remediation of environmentally damaged articles within the interior chamber of the container. The header assembly is adjustably moved relative to an upper edge region of the conversion door so as to permit vertical height adjustment thereof and fit the conversion door with respect to a vertical dimension of the access opening.

7 Claims, 9 Drawing Sheets

(56) References Cited

U.S. PATENT DOCUMENTS

| | | |
|---|---|---|
| 2009/0121509 A1* | 5/2009 | Coy et al. .................... 296/24.32 |
| 2011/0197767 A1* | 8/2011 | Seitz ................................ 95/286 |
| 2011/0297675 A1* | 12/2011 | Johnson et al. ................... 220/8 |
| 2012/0037622 A1* | 2/2012 | Cantin et al. ................ 220/23.83 |
| 2012/0076607 A1* | 3/2012 | Crane et al. ...................... 410/94 |
| 2013/0047521 A1* | 2/2013 | Yoder ............................. 52/79.7 |
| 2013/0229028 A1* | 9/2013 | Yang ........................... 296/146.9 |

\* cited by examiner

METHODS FOR THE CONVERSION OF STORAGE CONTAINERS FOR THE REMEDIATION OF ENVIRONMENTALLY DAMAGED ARTICLES

CROSS-REFERENCE TO RELATED APPLICATION

This application is a divisional of commonly owned copending U.S. application Ser. No. 13/447,782, filed Apr. 16, 2012 (now U.S. Pat. No. 9,004,306), which is based on and claims domestic priority benefits under 35 USC §119(e) from U.S. Provisional Application Ser. No. 61/482,505 filed May 4, 2011, the entire contents of each of which are expressly incorporated hereinto by reference.

FIELD

The disclosed embodiments herein relate to storage containers and methods that are especially adapted to permit remediation of environmentally damaged articles, e.g., articles that may have been damaged from fire, smoke, water and/or airborne contaminants.

BACKGROUND

There are numerous instances where articles at a given site are damaged by environmental events, such as smoke related to an on-site fire and/or site flooding (either natural or man-made (e.g., potable or non-potable water conduit breaks). When exposed to these environmental events, it is oftentimes more cost-effective to the owners and/or insurers to remediate if at all possible the damaged articles to their original state prior to being damaged by the environmental event.

The type of damage will dictate the remediation effort and the equipment involved in such remediation. Thus, for example, in the case of water-damaged articles, the remediation effort will likely include exposing the articles for a sufficient time to a controlled dehumidifying environment. Similarly, smoke-damaged articles may be remediated by exposing the damaged articles for a sufficient time to a controlled ozone environment. Suffice it to say, that remediation of such environmentally damaged must be conducted in a closed chamber space in which the interior environment can be controlled by suitable atmospheric inputs and outputs.

Conventional remediation efforts for environmentally damaged articles typically involve a remediation specialist physically removing the damaged article from the damage site and then transporting them to a remote warehouse location equipped with static remediation chambers. Depending on type of environmental damage, the articles may then be remediated within the static chambers by controlling the atmosphere within the chamber and transported back to the damage site (after of course the site has itself been remediated) where they may be placed once more into active service.

As can be appreciated, the removal and transport to/from the environmentally damaged site adds substantial costs to the remediation effort. It would therefore be especially desirable if mobile on-site remediation chambers could be provided so that environmentally damaged articles could be remediated at or near the damage site thereby avoiding the need to physically transport the damaged articles to a remote off-site location. Such on-site remediation would then translate into substantial cost savings for the remediation effort as transportation of many (if not all) of the damaged articles to/from the site of the environmental event could be eliminated. It is towards fulfilling such needs that the present invention is directed.

SUMMARY OF EXEMPLARY EMBODIMENTS

The present invention proposes a convertible storage container for the remediation of environmentally damaged articles. The container will define an interior chamber for receiving the environmentally damaged articles therein, the container having at least one container door for closing an access opening into the container. A conversion door is removably positionable with respect to the access opening so as to close the access opening with the container door in an opened condition. The conversion door includes a conversion door panel and a plurality of access ports through the door panel for connection of ducts to permit remediation of the environmentally damaged articles within the interior chamber. In some embodiments, the access ports will comprise flanges to accept connection of a respective duct thereto.

The conversion door may include a header assembly to permit vertical height adjustment of the conversion door to fit the conversion door to be fitted with respect to a vertical dimension of the access opening. In some embodiments, the header assembly will have a pair of header boards and a spacer board therebetween. An upper edge region of the conversion door panel may thus be sandwiched between the pair of header boards, and wherein the header boards are vertically moveable with respect to the upper edge region to permit vertical height adjustment of the conversion door. A friction lock may be provided to positionally lock the header assembly relative to the conversion door panel.

According to other embodiments, at least some of the access ports and the flanges have different sizes as compared to one another and/or flanges coaxially positioned with respect to such access ports and/or plug assemblies for removably closing the flange. In those embodiments where flanges are provided, it is presently preferred to have interior and exterior flanges coaxially aligned with one another and with the respective access port. In such a situation, interior and exterior plugs may be provided, in which case a closure assembly is also provided to close the plugs with respect to their respective flanges. The closure assembly may comprise a bolt and nut assembly.

A conversion door for converting a storage container to a remediation unit is also provided. In some embodiments the conversion door will comprise a door panel and a plurality of access openings defined through the door panel. Flanges are attached to the door panel in coaxial relationship to respective access openings to accept connection of a duct thereto. A header assembly may be positioned at and vertically moveable with respect to an upper edge region of the door panel to permit for vertical height adjustment of the conversion door.

According to some embodiments, the header assembly of the conversion door may comprise a pair of header boards and a spacer board therebetween. One edge of each of the header boards may also be interiorly recessed with respect to a lateral edge of the door panel (e.g., to permit one of the container doors to close upon the door panel to positionally retain the door panel in the access opening).

A method of converting a storage container to a remediation unit for remediating environmentally damaged articles is also provided. Preferably, the method will include providing a storage container which defines an interior chamber for receiving environmentally damaged articles therein and having at least one container door for closing an access opening into the container; opening the container door to provide access to the interior chamber through the access opening; positioning a conversion door in the access opening, the conversion door having a conversion door panel and a plurality of access ports through the door panel; and connecting at least one of the access ports to a duct associated with remediation equipment to permit remediation of environmentally damaged articles within the interior chamber.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION

Figure 1:
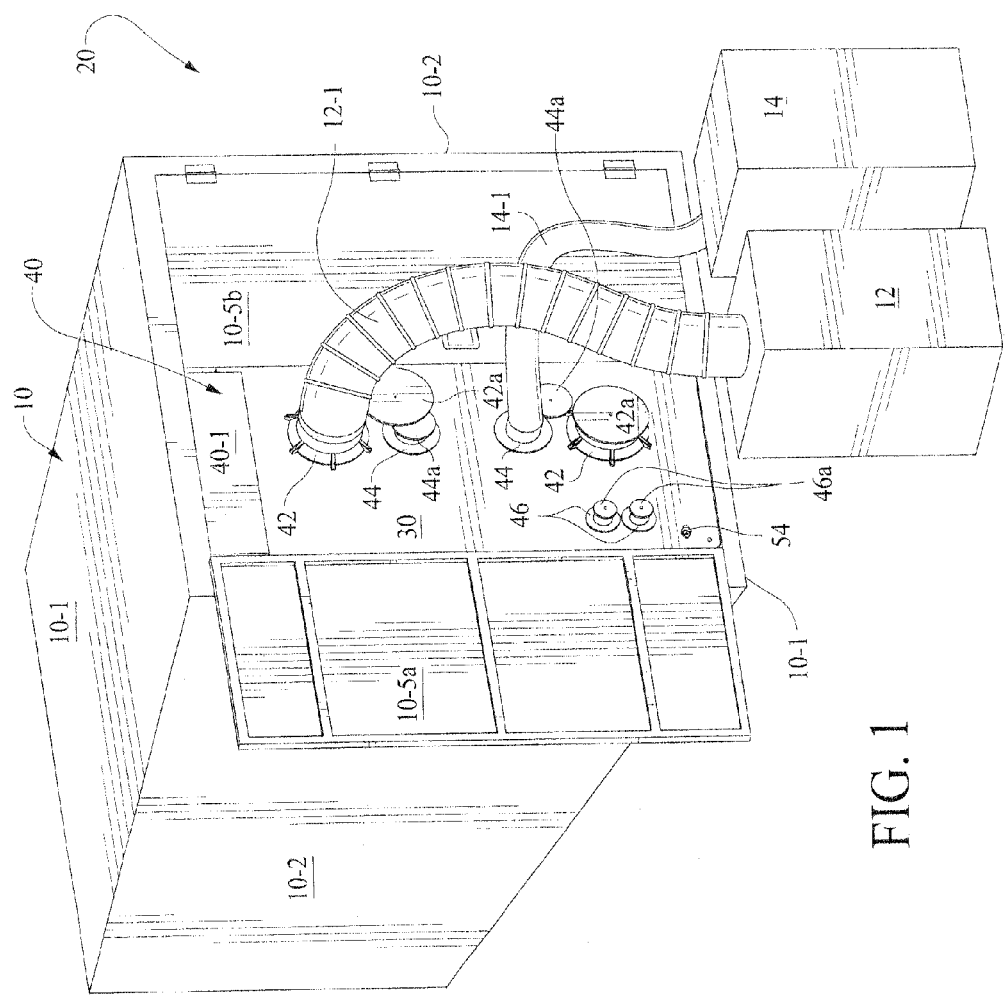
FIG. 1 depicts a front perspective view of a convertible storage container which embodies the present invention.

Accompanying FIG. 1 depicts a storage container 10 that has been converted to an on-site remediation unit 20 in accordance with a preferred embodiment of the invention. As depicted, the storage container 10 is in and of itself conventional in that it includes opposed pairs of walls 10-1, 10-2 and a pair of hinged doors 10-5a, 10-5b opposing a rear wall (not shown). The container 10 thus defines an enclosed interior chamber space 10-7 (see FIG. 8).

When placed into service as a remediation unit 20, a conversion door 30 will removably be positioned in the space otherwise occupied by the door 10-5a. As is perhaps best shown in FIGS. 2-4, the conversion door 30 is provided with a door panel 30-1 having a plurality of access ports 32, 34 and 36 (see FIG. 3) therethrough. In preferred embodiments, the ports 32 will be of larger diameter as compared to the ports 34 and the ports 34 will be of larger diameter as compared to the ports 36 so as to accommodate different sizes of ducts. For example as depicted in FIG. 1 different sizes of ducts 12-1, 14-1 associated with a HEPA filter unit 12 for removing and filtering air from the unit 20 and a dehumidifier 14 for introducing a dehumidified environment within the unit 20 are connected to respective ones of the access ports 42 and 44, respectively.

Figure 3:
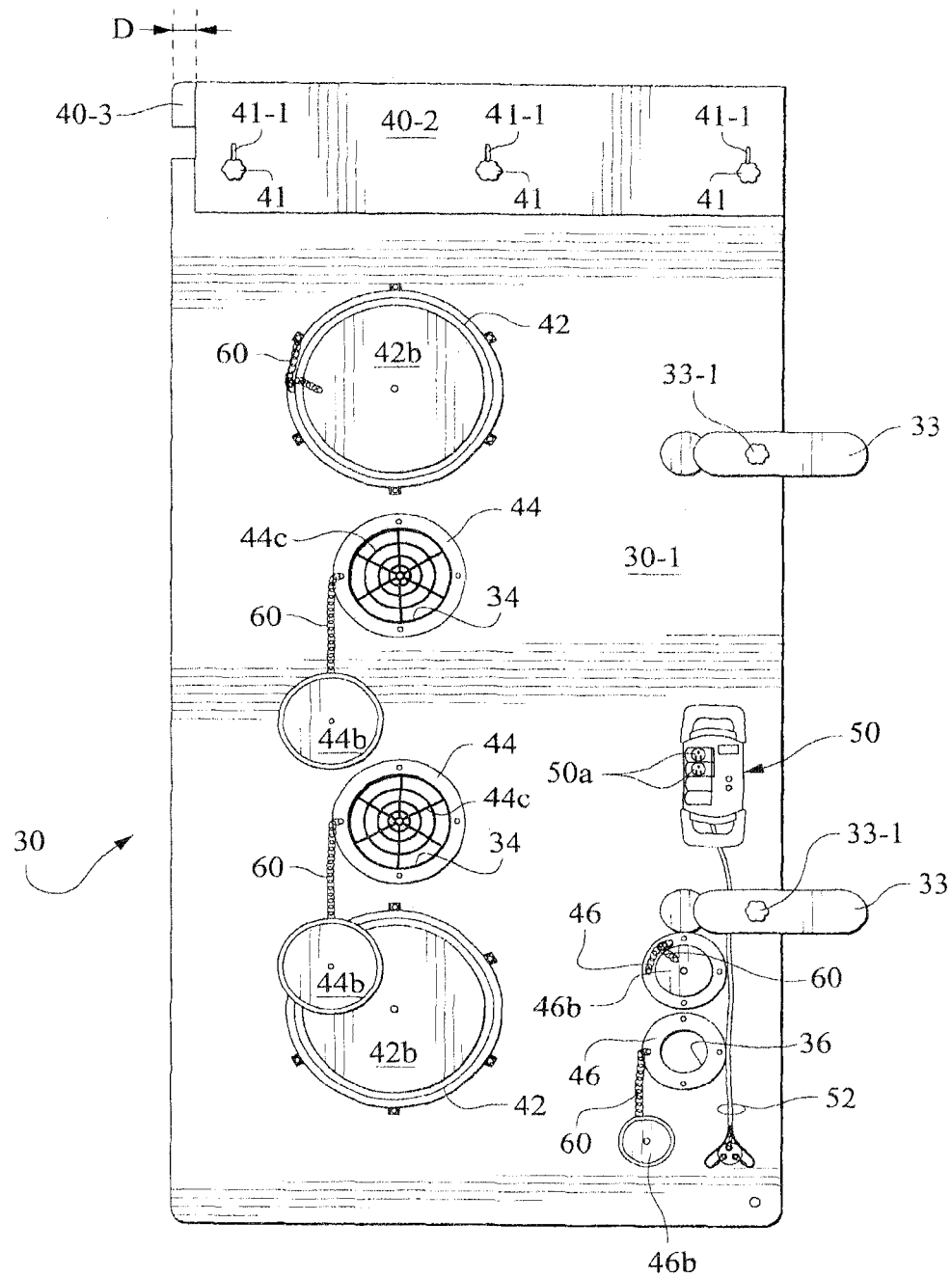
FIG. 3 is rear elevational view of the conversion door depicted in FIG. 2.
Figure 4:
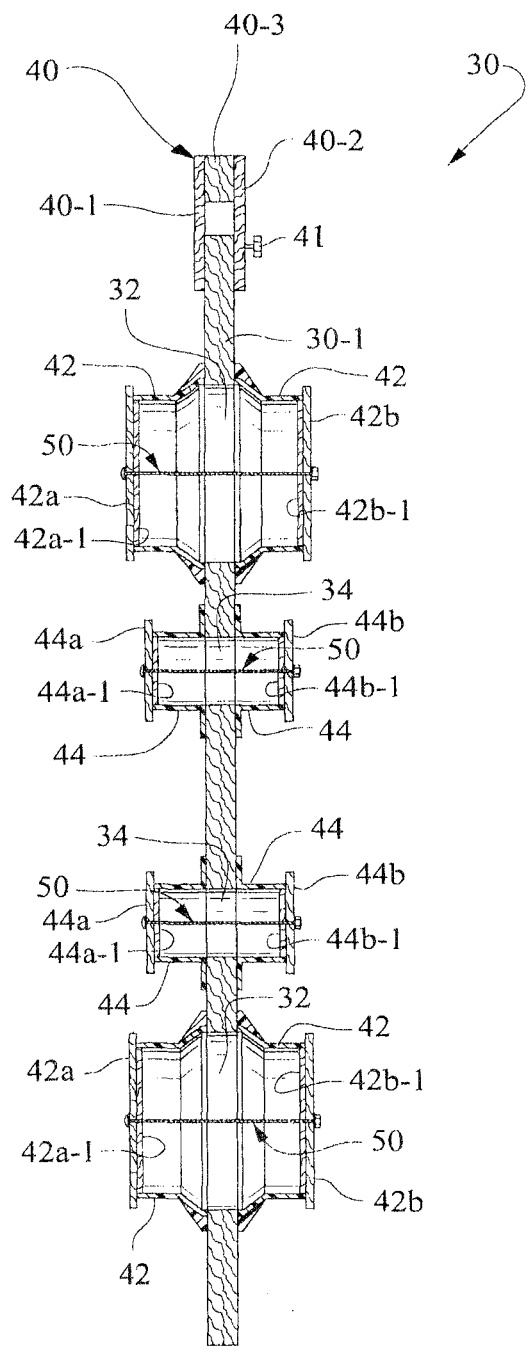
FIG. 4 is a cross-sectional elevational view of the conversion door depicted in FIG. 2 as taken along line 4-4 therein.

The door 30 is also provided with a vertically adjustable header assembly 40 comprised of a pair of header boards 40-1, 40-2 and an upper spacer board 40-3 therebetween (see FIG. 4). The spacer board 40-3 thus fixes the separation distance between the boards 40-1, 40-2 so as to permit the upper edge region of the conversion door panel 30-1 to be sandwiched therebetween. A series of friction locks 41 cooperates with vertically oriented slots 41-1 (see FIG. 3) to allow for vertical movement of the header boards 40-1, 4-2 and thereby permit the header assembly 40 to be adjusted in a vertical direction to fit the conversion door 30 to the vertical dimension of the space previously occupied by the container door 10-5a and then locked in place.

Figure 2:
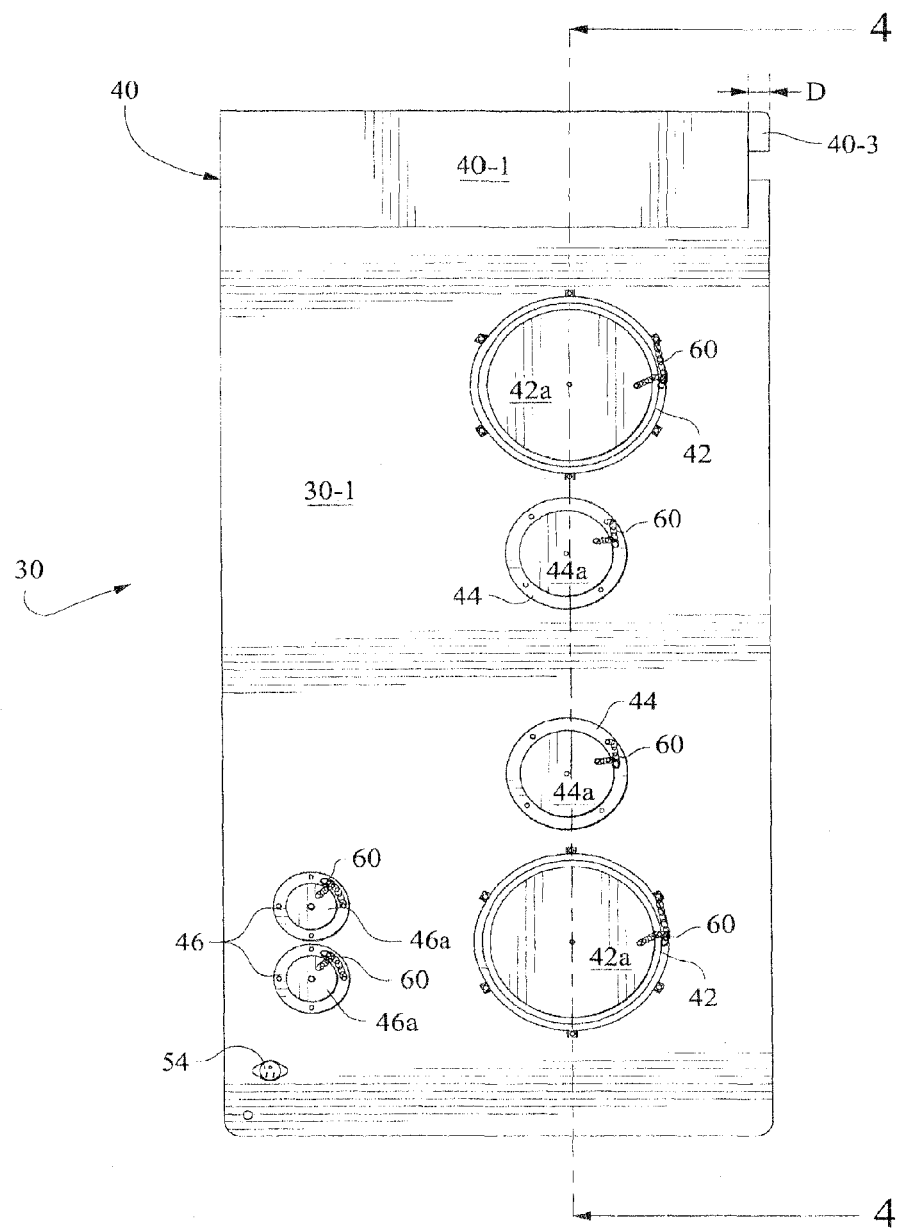
FIG. 2 is an enlarged front elevational view of an embodiment of a conversion door that may be employed in the convertible storage container depicted in FIG. 1.
Figure 7:
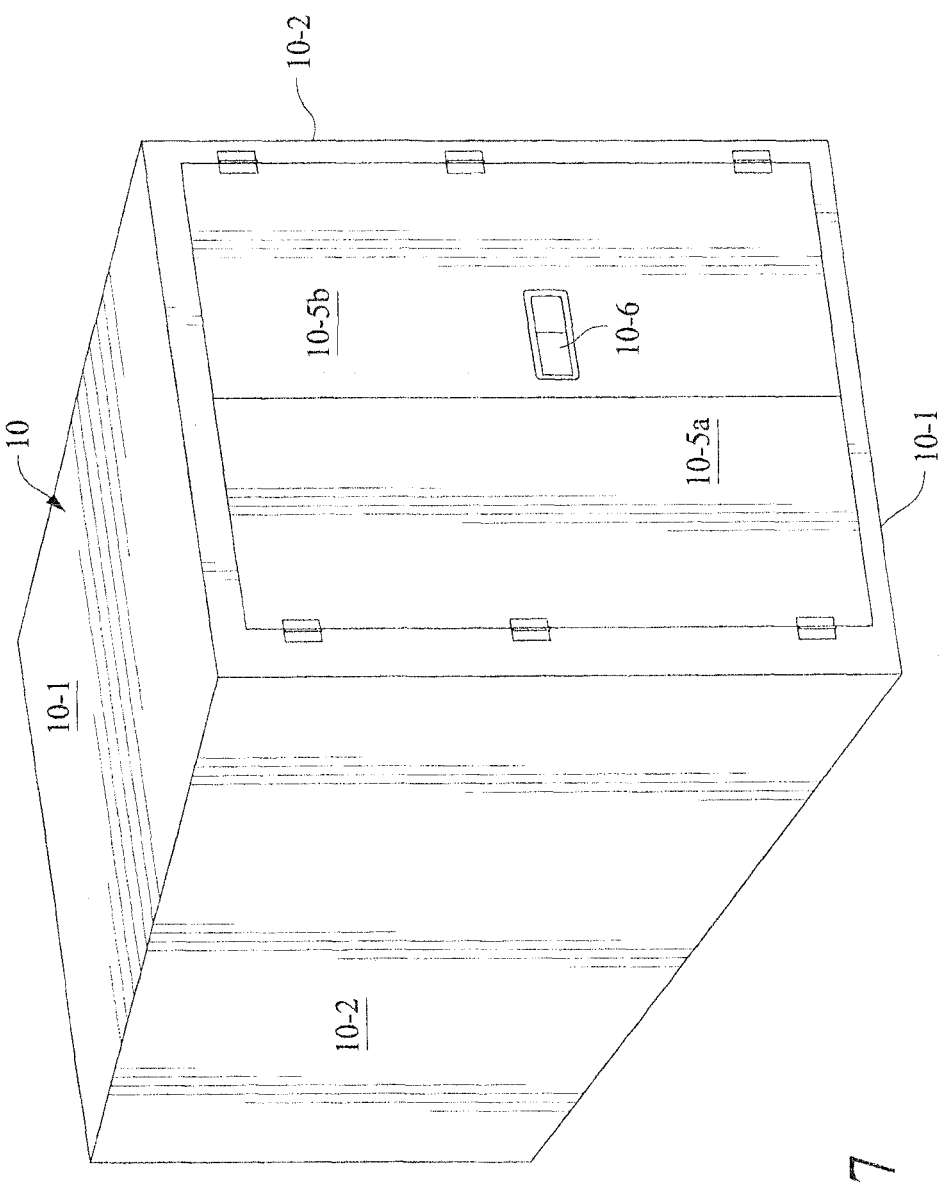
FIGS. 7-9 are front perspective views showing a sequence to convert the storage container for use in the remediation of environmentally damaged articles.

It will also be observed in FIGS. 2 and 3 that the boards 40-1, 40-2 are laterally recessed from the lateral edge of spacer board 40-3 by a dimension D so as to permit an edge region of the door 10-5b to close onto the conversion door 30 and thereby positionally restrain the conversion door 30 against the upper and lower recessed container door channels 10-8a, 10-8b (see FIG. 7). Pivotally moveable latche members 33 are provided with friction locks 33-1 along an outside lateral edge of the conversion door 30 (see FIGS. 3 and 5). The latche members 33 are of sufficient length to span over the interior lateral door frame 10-8c and thereby assist in positionally locking the conversion door 30 relative to the container 10.

The conversion door 30 may also be provided with an electrical power distribution unit 50 on its interior surface (see FIG. 3). The power distribution unit 50 may include a number of power receptacles 50a (preferably ground fault protected) adapted to be connected to electrically powered equipment (e.g., fans, dehumidifiers, ozone generators, etc.) that may be needed to be positioned within the chamber space 10-7 of the container 10. The power distribution unit 50 is operatively connected via electrical cable 52 to an external electrical power receptacle 54 that may in turn be connected to an external source of electrical power (e.g., from an externally positioned generator or other on-site electrical power supply).

In the embodiment depicted, the access ports 32 may be sized to accept 12-inch diameter ducts while the access ports 34 may be sized to accept 8-inch diameter ducts. A smaller diameter pair of ports 36 may also be provided which could, for example, be sized to accept 4-inch diameter ducts to allow input/discharge of ambient air, for example. As can be appreciated, the exact size of the ports 32, 34 and 36 is not critical and virtually any size could be provided in dependence upon the remediation equipment desired. However, it is presently preferred that a number of differently sized access ports be provided so as to provide the user with flexibility and universality of use with standard remediation equipment and its associated ducting.

In order to permit coupling of the ducts, each of the access ports is provided with a pair of flanges 42, 44 and 46 positioned on the exterior and interior sides of the conversion door 30. Each of the pair of flanges 42, 44 and 46 is coaxially positioned with respect to one another and with respect to its respective access port 32, 34 and 36 with which it is associated.

Since not all of the access ports 32, 34 and 36 will necessarily be required to be placed into service for each remediation effort, the flanges 42, 44 and 46 are provided with paired exterior and interior plugs 42a/42b, 44a/44b and 46a/46b, respectively. These plugs 42a/42b, 44a/44b and 46a/46b thus serve to effectively close the ports 42, 44 and 46, respectively, when one or more is not needed for a particular remediation effort.

The ports 32, 34 and/or 36 may be provided with a suitable grill (e.g., shown by reference numerals 44c in FIG. 3) to prevent passage of relatively large solid objects therethrough.

The relative size of the grill openings will of course determine the maximum size of solid objects that can pass through the ports 32, 34 and/or 36.

Each of the plugs 42a/42b, 44a/44b and 46a/46b will preferably be provided with an inner plug member, such as members 42a-1/42b-1 and 44a-1/44b-1 as shown in FIG. 4, sized and configured to be accepted within their respective ports 42 and 44. (Although not depicted in the drawings, the plugs 46a and 46b could also likewise be provided with a similar plug member.)

Figure 5:
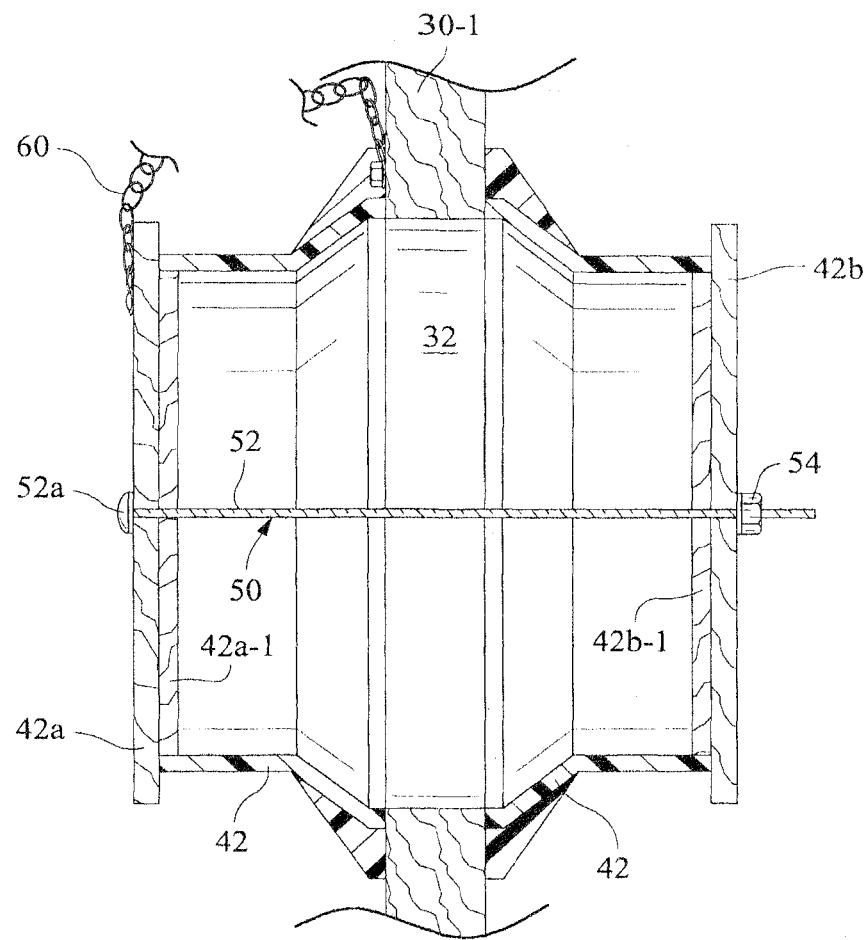
FIG. 5 is an enlarged cross-sectional elevational view of an exemplary access port and association closure plugs of the conversion door.

The pairs of plugs 42a/42b, 44a/44b and 46a/46b are retained in a closed relationship with respect to their respective access ports 32, 34 and 36 by means of a nut and bolt closure assembly 50. An exemplary closure assembly 50 is depicted in FIG. 5. As shown, the assembly is generally comprised of an elongate bolt 52 which is of sufficient length to span the plugs 42a and 42b. One end of the bolt includes a bolt head 52a which is positioned against the plug 42a while the other end includes a nut 54 threaded thereon. A washer (not shown) may be interposed between the head 52a and the plug 42a and/or the nut 54 and the plug 42b. Threaded tightening of the nut 54 will in turn forcibly press each of the plugs 42a, 42b against their respective flange 42 so as to close the access port 32. When it is desired to open the access port 32 for use, one may threadably remove the nut 54 from the bolt 52 to thereby disengage the closure assembly 50 at which time the plugs 42a and 42b may be removed from the flanges 42. A flexible cord or chain (represented generally by reference numeral 60) may be attached to the plugs 42a, 42b so as to tether the same to the conversion door 30. The structures discussed above are also preferably provided with the plug pairs 44a/44b and 46a/46b.

Figure 8:
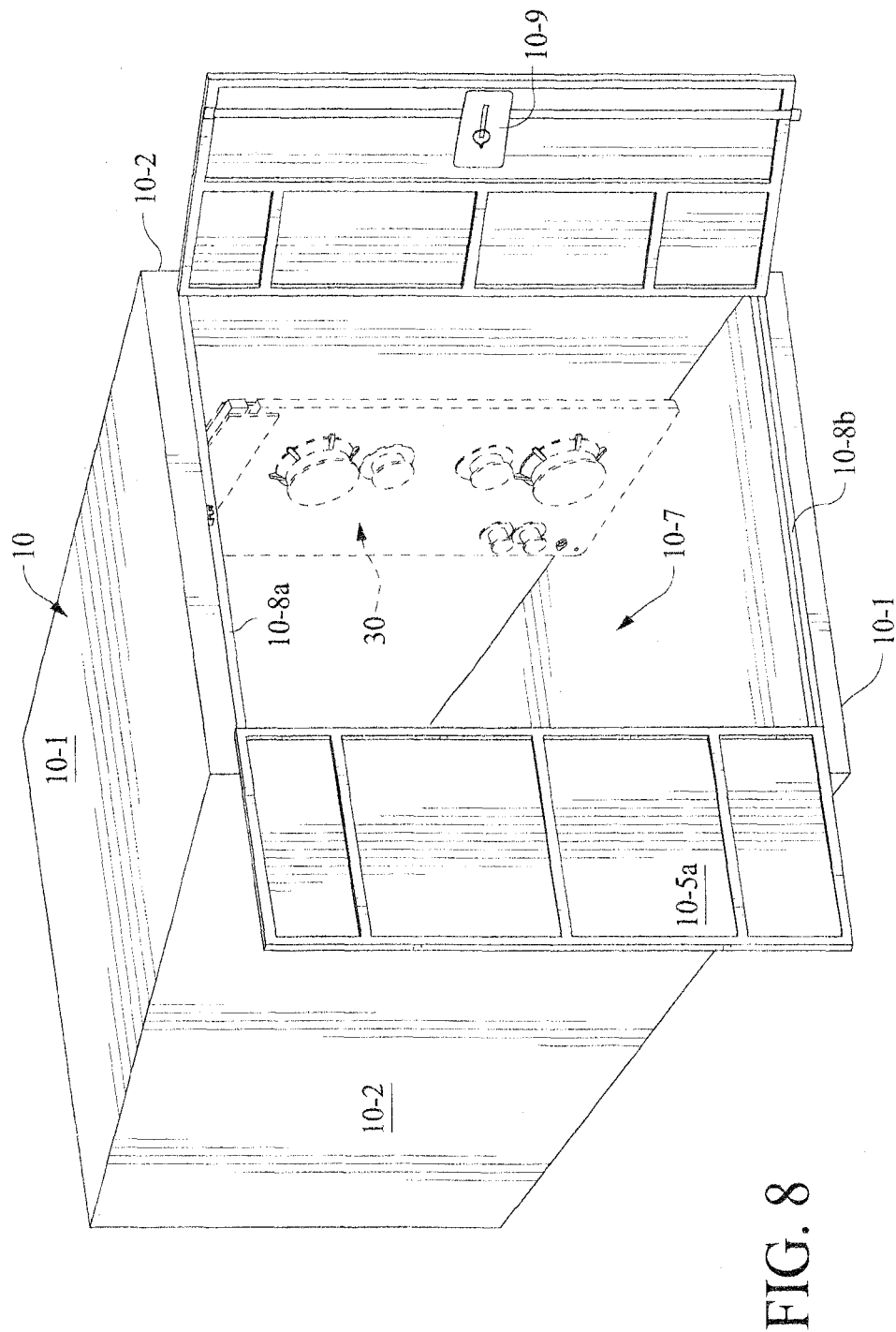
Figure 9:
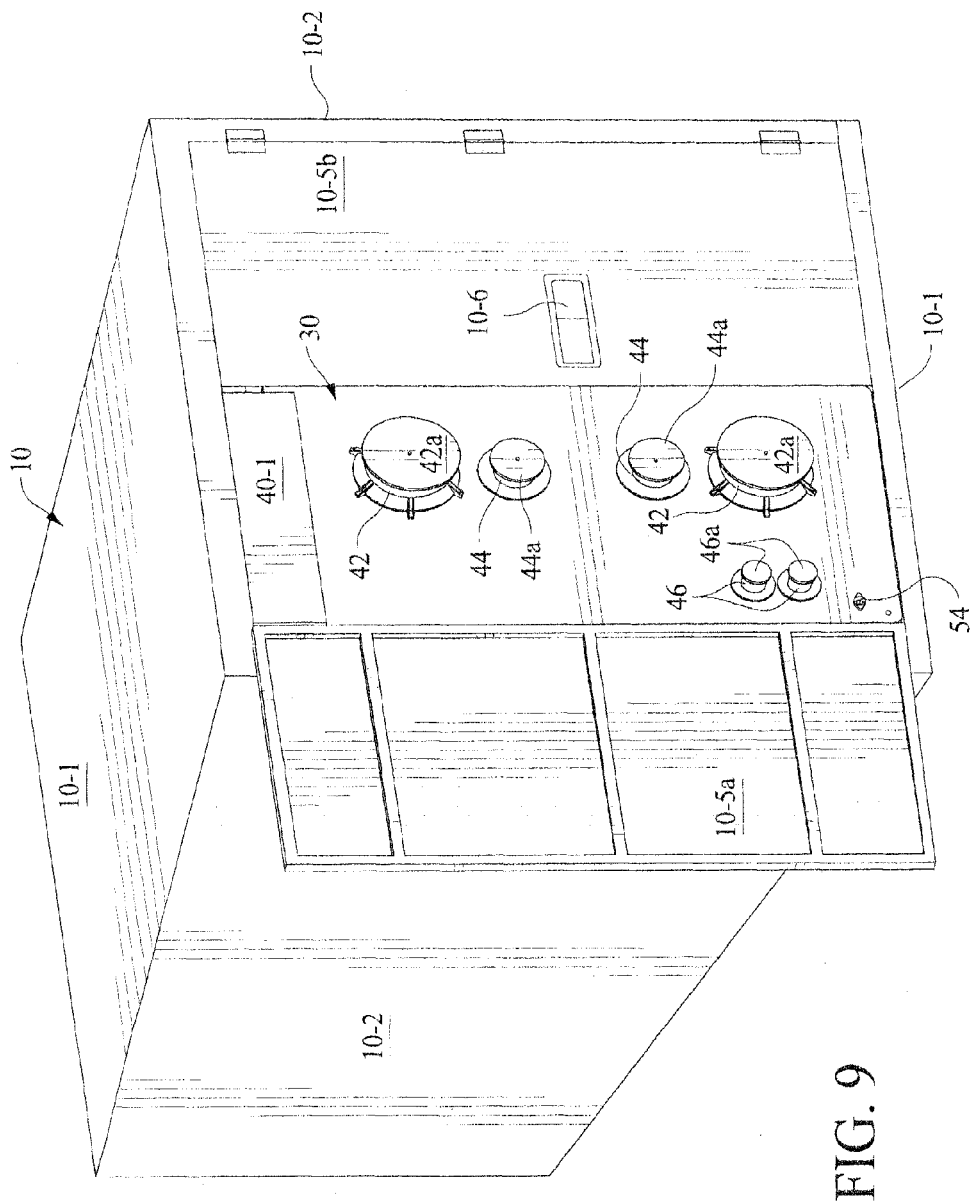

As shown by FIGS. 7-9, a conventional storage container 10 may in use be delivered to and positioned at an appropriate location of a remediation site. One possible storage container and means of transporting it to a remediation site is disclosed in U.S. Pat. No. 7,074,004 (the entire content of which is expressly incorporated hereinto by reference). In the embodiment depicted, the door 10-5b will include a handle 10-6 which serves to operate a conventional internal door latching mechanism 10-9 (see FIG. 8). When latched by the latching mechanism, the door 10-5b will thus secure the opposite door 10-5a against the door frames 10-8a and 10-8b. Such a closed and latched condition is depicted in FIG. 7.

When it is desired to covert the container 10 to a remediation unit 20, door 10-5a is unlatched by means of the handle 10-6 so the door 10-5a can be pivoted about its hinges to an opened condition. Once opened, door 10-5b may likewise be pivoted about its hinges in an opposite direction to the door 10-5a so as to assume its opened condition. With both doors 10-5a and 10-5b being in their opened conditions as shown in FIG. 8, the entire interior chamber 10-7 will then be accessible to receive environmentally damaged articles in need of remediation. If needed the interior chamber 10-7 can also then receive placement of suitable remediation equipment (e.g., fans, dehumidifiers, ozone generators, etc.).

Figure 6:
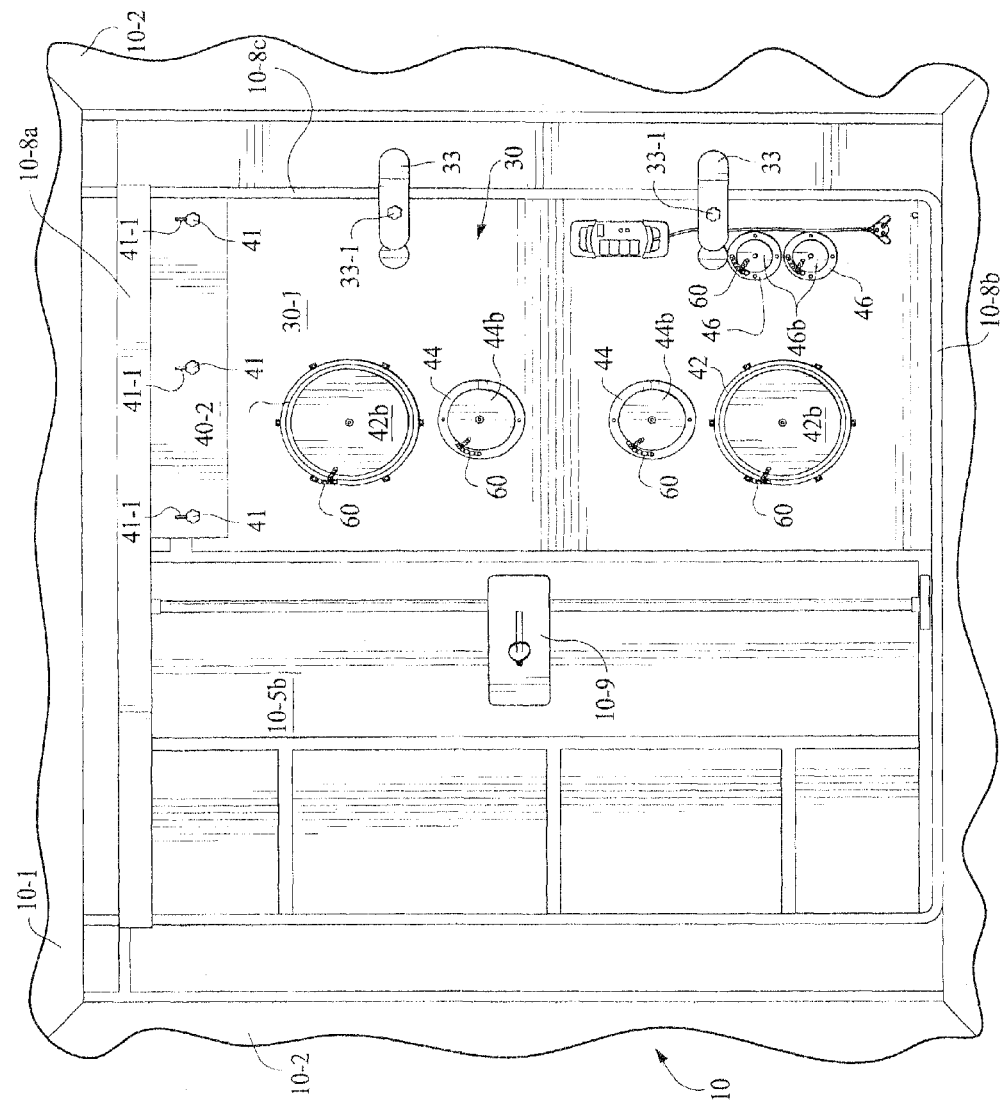
FIG. 6 is an elevational view of the conversion door as viewed from within the interior chamber of the storage container in which the conversion door is installed.

The conversion door 30 may be transported within the interior chamber 10-7 of the container 10 as shown in dashed line in FIG. 8. Alternatively the conversion door 30 may be transported separately of the container 10 to the remediation site. However it may be transported the conversion door 30 will be assembled upright so it occupies the space that was originally occupied by the door 10-5a when the latter is in its closed condition. The header assembly 40 is adjusted vertically to ensure that the vertical dimension of the conversion door 30 fits within the vertical dimension of the door frames 10-8a, 10-8b. Once the vertical height of the door 30 is adjusted by means of the header assembly 40, the interior latches 33 may be pivoted into their latched condition (see FIG. 6). The door 10-5b may remain in its opened condition until all remediation equipment and/or environmentally damaged articles are positioned within the internal chamber 10-7, following which the door 10-5a may be pivoted into its closed and latched condition as shown in FIG. 9 to thereby establish the conversion of the container 10 into the remediation unit 20. The various ports 32, 34 and/or 36 may then be coupled to ducts and appropriate remediation equipment in the manner previously described.

Following remediation, the door 10-5b may again be opened to allow the remediated articles to be removed from the internal chamber 10-7. Additional articles may then be placed within the chamber 10-7 and the process repeated. Once all articles have been remediated, the remediation unit 20 may be converted back to the storage container 10 by removal of the conversion door 30 (i.e., generally reversing the steps described above with reference to FIGS. 7-9).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A method of converting a storage container to a remediation unit for remediating environmentally damaged articles, the method comprising the steps of:
   (a) providing a storage container which defines an interior chamber for receiving environmentally damaged articles therein and having at least one container door for closing an access opening into the container when in a closed condition and opening the access opening into the container when in an opened condition;
   (b) opening the container door to provide open access to the interior chamber through the access opening;
   (c) positioning a conversion door in the access opening, the conversion door having a conversion door panel and a plurality of access ports through the door panel;
   (d) connecting at least one of the access ports to a duct associated with remediation equipment to permit remediation of environmentally damaged articles within the interior chamber; and
   (e) adjusting a vertical height of the conversion door by vertically adjustably moving a header assembly relative to an upper edge region of the conversion door panel.

2. The method as in claim 1, wherein the header assembly comprises a pair of header boards and a spacer board therebetween, and wherein the step of adjusting the vertical height of the conversion door includes vertically moving the pair of header boards with respect to the spacer board to permit vertical height adjustment of the conversion door.

3. A method as in claim 2, which comprises positionally locking the header assembly relative to the conversion door by manipulating a friction lock associated with the header assembly.

4. A method as in claim 1, wherein prior to step (d) there is practiced the step of removing a plug which closes the at least one access port.

5. The method as in claim 1, wherein the access ports include flanges, and wherein step (d) includes connecting the duct to a flange of at least one of the access ports.

6. A method as in claim 1, which wherein each access port comprises interior and exterior flanges to accept connection of a respective duct thereto, and wherein the method comprises closing at least one of the access ports by removably attaching a pair of plugs to each of the interior and exterior flanges thereof by a bolt and nut assembly.

7. The method as in claim 1, wherein
the container has a pair of container doors which collectively define the access opening, and wherein
step (b) comprises opening each of the container doors, and wherein
step (c) comprises positioning the conversion door in one part of the access opening occupied by one of the container doors when in a closed condition, and thereafter closing the other of the container doors onto the conversion door so as to positionally retain the conversion door in the one part of the access opening.

* * * * *